United States Patent [19]

Jackowski

[11] Patent Number: 4,531,748
[45] Date of Patent: Jul. 30, 1985

[54] FLUID SEAL WITH UNITARY WEAR SLEEVE ELEMENT

[75] Inventor: Ronald A. Jackowski, Algonquin, Ill.

[73] Assignee: Chicago Rawhide Manufacturing Co., Elgin, Ill.

[21] Appl. No.: 595,509

[22] Filed: Mar. 30, 1984

[51] Int. Cl.³ .............................................. F16J 15/32
[52] U.S. Cl. .................................... 277/153; 277/50; 277/166
[58] Field of Search .................. 277/47, 50, 152, 153, 277/165, 166

[56] References Cited

U.S. PATENT DOCUMENTS

| 2,804,324 | 8/1957 | Stallings | 277/153 |
| 3,021,161 | 2/1962 | Rhoads et al. | 277/39 X |
| 3,156,474 | 11/1964 | Nelson | 2776/153 X |
| 3,210,086 | 10/1965 | Hudson et al. | 277/153 X |
| 3,341,265 | 9/1967 | Paterson | 277/153 X |
| 4,083,567 | 4/1978 | Thumm | 277/153 X |
| 4,136,885 | 1/1979 | Uhrner | 277/42 X |
| 4,252,329 | 2/1981 | Messenger | 277/153 X |

FOREIGN PATENT DOCUMENTS

| 2500099 | 7/1976 | Fed. Rep. of Germany | 277/153 |
| 590874 | 7/1947 | United Kingdom | 277/152 |
| 879503 | 10/1961 | United Kingdom | 277/47 |
| 884,988 | 12/1961 | United Kingdom | 277/153 |
| 1034756 | 7/1966 | United Kingdom | 277/153 |

Primary Examiner—Robert S. Ward
Attorney, Agent, or Firm—James T. FitzGibbon; Angelo J. Bufalino

[57] ABSTRACT

An improved seal assembly which provides a seal having a unitizing element adapted to fit over one portion of a sealed mechanism and a primary seal assembly adapted to be received within or with respect to another sealed part which moves relative to the first sealed part. The seal includes a unitizing or locking flange made from a reduced thickness or skirt portion at the end of the wear sleeve on the unitizing element, such flange being axially offset from the seal contact band. The assembled seal is made from a casing unit, an elastomer which provides a mounting surface an a resiliency imparting element, together with a bonded fluoroelastomer ring which is assembled protectively with a unitizing casing which includes a wear sleeve portion having one radial flange thereof forming a protective element and the other being a unitizing flange made from an end portion of the wear sleeve.

12 Claims, 9 Drawing Figures

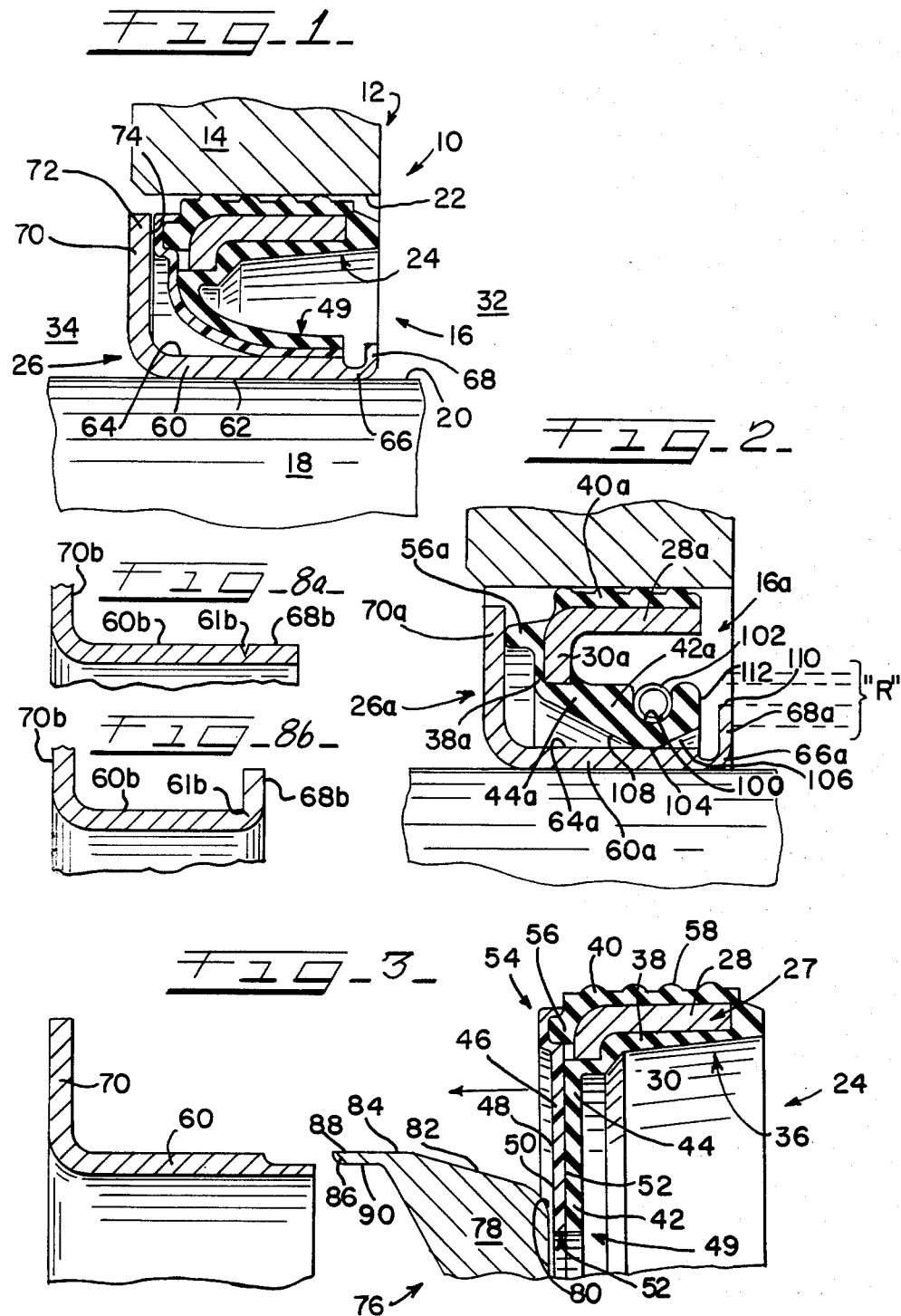

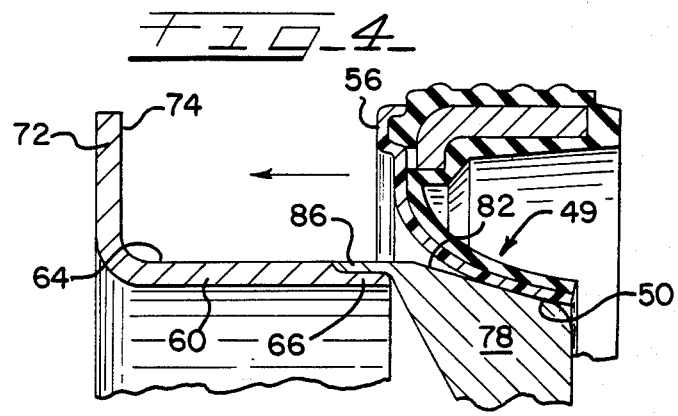
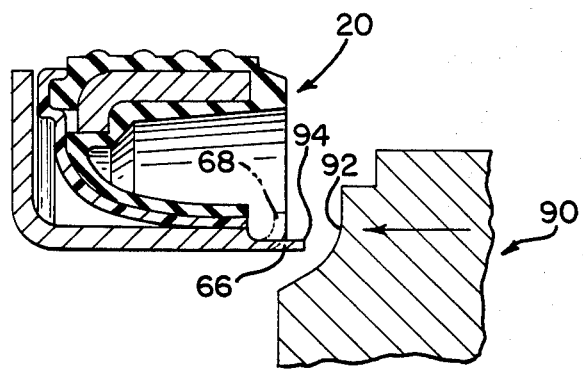
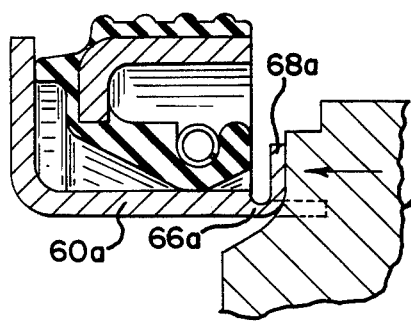
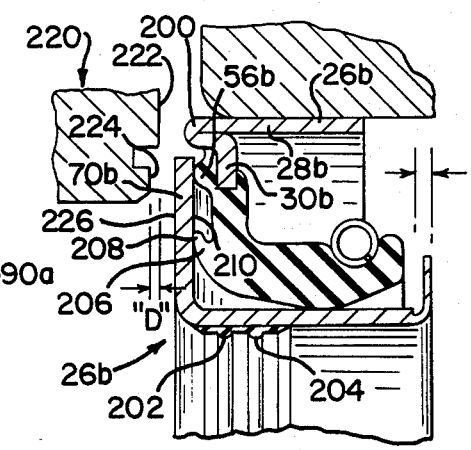

FLUID SEAL WITH UNITARY WEAR SLEEVE ELEMENT

BACKGROUND OF THE INVENTION

The present invention relates generally to fluid seals and methods, and more particularly, to assembled or unitized seals and methods of assembling them by insert molding and bonding so as to insure that they may be protected against damage after manufacture and during shipment and installation.

Historically, oil seals and other fluid seals, such as those used to retain grease or the like within sealed cavities, were made from primitive materials such as leather or the like. With the advent of synthetic rubber, particularly oil resistant rubbers and the like, great improvements in the design of seals were made. Rubber is very advantageously used as a primary seal material because it is relatively rugged, is resilient for a snug fit over an associated shaft, and because it retains its elasticity over a long period of time.

More recently, other synthetic materials which are themselves not ideal for seal application have been able to be made in special forms, or to be combined with other materials to provide good sealing performance. Included among these are materials such as polymers of tetrafluoroethylene or the like, which are characterized by a very lubricous surface, and which are able to perform a sealing function if properly constructed and arranged. An advantage of these synthetic materials is that they resist rapid wear, they perform very well in relatively dry environments, such as those wherein all or part of the seal is not literally immersed in oil, they perform well in some dusty environments, and they are also advantageous wherein the sealed medium itself is not particularly lubricous.

However, fluorocarbon materials do not wear well when mated with rough surfaces, and synthetic rubbers do not perform well in dry sealing environments. Fluorocarbon materials are very susceptible to nicking or other surface damage which compromises their ability to seal effectively.

A seal failure is very critical in modern sealed mechanisms wherein the seal itself may cost relatively little, but wherein the value of the sealed mechanism and hence the damage potential in the event of seal failure, is large, or wherein the seal is inaccessibly located, as is common with many compact and complex machines of today. Still further, there is the problem of materials which are resistent to wear and nicking but which themselves are relatively hard and therefore tend to cut grooves or the like in associated shafts, causing a problem with eventual replacement.

Under these circumstances, there has been an increasing need for so-called unitized seals, that is, seals wherein both the sealed-against or wear sleeve element is combined with the seal element itself into a single mechanism. By "unitizing" or preassembling these elements, proper dimensional installation is achieved, protection against nicking or other damage during handling is avoided, prelubrication, if desired, may be insured, and correct dimensional or manufacturing tolerances may be controlled at the point at which the seal is manufactured as opposed to the point at which the other parts are manufactured or assembled.

According to the invention, improved, relatively simplified assembled or unitized seals are provided, and methods are also provided for assembling the seal so that the damage sought to be avoided during installation in the customer's manufacturing facility is able to be avoided in the seal maker's own manufacturing facility.

In view of the need for specialty assembled seals, it is an object of the invention to provide improved methods for manufacturing assembled, unitized seals having two components protectively held together for shipment and installation.

Another object of the invention is to provide a improved seal assembly which provides a seal having a unitizing element adapted to fit over one portion of a sealed mechanism and a primary seal assembly adapted to be received within or with respect to another sealed part which moves relative to the first sealed part.

A still further object of the invention is to provide a seal which includes a unitizing or locking flange made from a reduced thickness or skirt portion at the end of the wear sleeve on the unitizing element, such flange being axially offset from the seal contact band.

A still further object of the invention is to provide an assembled seal made from a casing unit, an elastomer which provides a mounting surface and a resiliency imparting element, together with a bonded fluoroelastomer ring and which is assembled protectively with a unitizing casing which includes a wear sleeve portion having one radial flange thereof forming a protective element and the other being a unitizing flange made from an end portion of the wear sleeve.

Another object of the invention is to provide a method which includes using a mandrel or the like having a tapered body portion with a skirt thereon adapted to engage an axially extending portion of the wear surface of the seal unit, and a contoured end face portion to guide the seal body into a position overlying the wear surface during assembly, removing the mandrel therefrom after positioning the seal, and then forming a unitizing flange from an axially extending skirt on the casing into a radial locating or locking assembling flange.

A still further object of the invention is to provide a seal wherein the locking or unitizing flange is dimensioned so as to permit oil or other lubricant to contact the seal formed on the seal band of the primary seal lip, and yet to prevent free axial removal of the seal lip from the wear sleeve. Another object is to provide a unitizing construction and method which operates successfully both with seals having all-elastomeric seal bodies as well as seals having composite elastomer-fluorocarbon seal bodies.

The foregoing objects and advantages of the invention are achieved and practiced by providing a seal having a primary seal element including a casing element of annular form made from a relatively rigid material and having an at least partially elastomeric sealing lip body bonded thereto, and a single or one-piece wear sleeve and unitizing casing portion including a radial flange acting as as axially exterior protective element preventing relative axial movement of the associated primary seal in one direction, an axially extending wear sleeve portion having a cylindrical outer diameter surface facing toward and sealingly engaged with the seal band portion of the primary lip, and a second, unitizing or locking flange of reduced thickness and reduced diameter with respect to the protective flange and preventing axial removal of the primary seal unit in the other axial direction.

The invention also achieves its objects by providing a manufacturing method which includes forming the primary seal and a wear sleeve element with a protective flange and a reduced thickness skirt portion, placing a tapered mandrel skirt-engaging portion in overlying relation to the reduced diameter skirt of the wear sleeve, and sliding the primary lip portion of the primary seal unit over the tapered surface of the mandrel and into the desired position of use overlying the wear sleeve portion of the casing and thereafter utilizing a curling die to flange the skirt portion of the unitizing casing so as to provide a radially extending unitizing flange spaced apart from the radial protective flange of the wear sleeve element to lock the elements together.

The manner in which the foregoing and other objects and advantages of the invention are achieved in practice will become more clearly apparent when reference is made to the following detailed description of the preferred embodiments of the invention set forth by way of example and shown in the accompanying drawings, wherein like reference numbers indicate corresponding parts throughout.

BRIEF DESCRIPTION OF THE DRAWINGS

FIG. 1 is a vertical sectional view, with portions broken away, showing an assembled or unitized seal of the present invention in place in an application and forming a part of a sealed mechanism having two relatively rotatable elements;

FIG. 2 is a vertical sectional view of a modified form of assembled seal of the invention, also showing it in position of use;

FIG. 3 is a exploded view, partly diagrammatic, taken in vertical section and showing the manner in which one step of the assembly process resulting in the production of the seal of FIG. 1 is carried out;

FIG. 4 is a view similar to that of FIG. 3 and showing subsequent steps in the assembly method of the invention;

FIG. 5 is a view similar to FIGS. 3 and 4 and showing the final step in the assembly process of the seals of FIGS. 1 and 3–5.

FIG. 6 is a vertical sectional view of the seal of FIG. 2, showing the final step in the assembly thereof; and FIG. 7 is a vertical sectional view of another, further modified form of seal made according to the invention and showing the manner of installing the same in an application so as to achieve desired positions of the cooperating elements of the seal;

FIG. 8A is a vertical sectional view with portions broken away, showing an alternate form of unitizing casing construction, showing the casing before final assembly; and FIG. 8B is a view similar to FIG. 8, but showing the unitizing casing in its assembled position.

DESCRIPTION OF THE PREFERRED EMBODIMENTS OF THE INVENTION

While the preferred form of seal made according to the invention is one wherein the wear sleeve element is located on a rotary shaft or the like disposed radially inwardly of the principal seal element, it will be understood that the invention applies equally to seals wherein these parts are reversed, that is, with the seal band of the primary seal unit being urged radially outwardly against a seal companion flange or unitizing element which is disposed radially outwardly of it.

It is also understood that various elastomers are useful in making the seal of the invention as are fluorocarbon or other lubricous resinous materials, and consequently, the invention is not intended to be limited to the use of any particular material, except insofar as such material would not be suitable for use in a fluid seal of the type comprehended by the invention.

Still further, as used in the present description, the expression "assembled", or words of like import, should be taken to be synonymous with "unitized" as meaning a seal having two elements which are, after assembly, held together for cooperative sealing action. In such a seal, the entire assembly includes two major parts which rotate relative to each other, with a primary seal band area being formed as a seal lip or the like on one part, and a wear sleeve surface being formed on the other part. In other instances, not dealt with here, the expression "assembled" is sometimes taken to mean seals wherein the primary seal element itself, that is, an element containing both a casing and a body having a primary seal band thereon, are assembled by clamping, clinching, or the like rather than bonding. In the present description, the expression "assembled" is to be taken as synonymous with unitizing and not as implying that the attachment of the primary seal body to its associated mounting flange is done by crimping or clamping.

Referring now to the drawings, FIGS. 1 and 3–5 show a preferred form of unitized seal made according to the invention. Specifically, in FIG. 1, there is shown a seal assembly generally designated 10 installed in place within a machine assembly generally designated 12, and shown to include a cast housing 14 or the like having an opening 16 through which extends a rotary shaft 18 having an exterior surface portion 20. A counterbore 22 forms the interior diameter opening on the machine element or housing 14.

Referring to the seal 10, it is shown to include two principal components, the first being a seal element generally designated 24 and the second, component being a one-piece unitizing casing, generally designated 26. As shown in FIGS. 3–5, the primary seal element 24 includes a one-piece primary seal casing 27 having an axially extending, cylindrical mounting flange 28 and a radially inturned bonding flange 30. According to familiar terminology, the side of the seal lying to the right in the illustrated figures is known as the "oil side" of the seal, whereas the portion of the seal lying to the left is referred to as the "air side". Accordingly, in FIG. 1 the region shown as 32 is the enclosed or sealed region, while the region shown as 34 lies outside the sealed region. Consequently, as used herein and in the claims, the expression "axially inner" means toward the oil side of the seal or toward the interior of the sealed region, whereas "axially outer" refers to the portion of the seal directed or lying toward the exterior of the sealed region.

Referring to again to FIG. 3, for example, it is shown that in addition to the casing 27, the first seal element 24 includes an elastomeric seal body generally designated 36 and shown to comprise a bonding portion 38 lying inside the casing 27 and an exterior, mounting sleeve portion 40, and a radial force-applying principal seal body 42 with an intermediate or connecting body portion 44 lying between them. The seal unit also importantly includes a primary seal ring 46 made from a lubricous material such as a fluorocarbon ("Teflon") or like polymeric resin. The ring 46, as formed, has an axially outwardly directed surface 48 which will, on its radially innermost portion, form a seal band 50, and a reverse surface 52 which chemically bonded, in a known manner, to the elastomeric body 42. Consequently, the seal of FIGS. 1 and 2-5 has a composite body 49 made from a fluorocarbon resin element and an elastomeric, forceapplying element.

According to the invention, in the as-formed, or as-molded, condition, the primary lip of the seal includes the elastomeric and fluorocarbon ring portions 42, 46 which may be shaped by a mandrel or the like the position of FIG. 1. The elements 42, 46 are bonded to each other to form a composite body 49 and have in the as-formed condition, a common inner diameter cylindrical surface 52. In the preferred form, an annular "snubber" or rib portion generally designated 54 is also provided, which includes a fluorocarbon exterior formation 56 extending axially outwardly of the casing 26 and being supported beneath its surface by an elastomeric rib 56.

In the preferred form, the primary seal element 24 includes a plurality of annular mounting ribs 58 extending circumferentially around the elastomeric mounting sleeve 40 to provide ease of assembly. In the form of seal shown, the bonding portion 38 of the elastomeric seal body, in cooperation with the sleeve 40 and the rib 56 completely surround and encapsulate the casing 26, although this is not a necessary feature of the invention. Referring again to FIG. 1, it will be seen that the second component, namely the unitizing casing is made entirely of a rigid material such as steel or the like, and includes a central, generally cylindrical, axially extending wear sleeve portion 60 having a precisely ground or properly finished radially inwardly directed mounting surface 62 and a radially outwardly directed primary sealing surface 64. The axially inner end of the casing 26 includes a reduced thickness skirt portion 66 terminating in a radially outwardly extending unitizing or locking assembly flange 68.

The axially outermost portion of the casing 26 includes a radially outwardly extending protective flange 70 having an end portion 72 which is just slightly smaller in outside diameter than the elastomeric mounting body 40 of the primary seal element 24. An axially inwardly directed outer margin 74 on the flange 70 is adapted to engage to butt up against the surface of the 56 or to be spaced closely apart therefrom in use of the seal. In use, the casing 26 is press fit over the outside diameter of the shaft 18, and the sleeve 40 and ribs 58 are snugly seated within the counterbore 22. The primary seal is formed between the casing surface 64 and the exterior surface 50 of the composite seal body 49.

Referring now to the assembly of the seal, it will be assumed that the seal unit is formed as shown in FIG. 3 and that the ring 46 is of a deformable TFE or like polymer type bonded to the elastomeric body 42. For assembly of the seal unit, a mandrel generally designated 76 is provided and is shown to include a body portion 78 with a contoured exterior end 80, a tapering outside surface 82, an axially outer end 84 terminating in a mandrel skirt 86, having a reduced thickness and defined by inner and outer 88, 90, spaced apart from each other by a small thickness, such as 0.020 to 0.040 inches.

As shown in FIG. 4, once the units have been aligned in the relation shown in FIG. 3 the mandrel 7 is urged axially in the direction shown by the arrow to an extent sufficient to cause the skirt 86 to overlie the casing skirt 66. Thereafter, or at the same time, with the mandrel 78 and the casing 60 in both axial and radially aligned positions, the primary seal unit is urged toward the assembled position. This causes the composite lip portion 49 to assume the contoured or bell-mouthed shape shown. The axial movement operation is continued until the margin 74 on the flange 72 contacts the fluorocarbon rib 56 on the primary seal ring. Because the surface 82 of the mandrel is smooth and free from flaws, and the working or sealing surface 64 of the unitizing casing is likewise ground to a desirable finish, the working surface or primary seal forming portion 50 of the fluorocarbon ring is kept free from damage.

After the seal is fully aligned in the position shown in FIG. 5, a curling die 90 is urged towards the seal as shown in FIG. 6. At this point, the annular curved surface 92 on the die engages the edge portion 94 of the reduced thickness skirt 66, forming the curl 68 in the edge thereof. This simple step completes the assembly and the seal is then in the final form shown in FIG. 1.

Referring now to FIG. 2, another form of seal assembly is shown. In this form the one-piece unitizing casing generally designated 27A, is the same as its counterpart in FIG. 1, including the cylindrical wear sleeve portion 60A having the inner sealing surface 64A and the readial protective flange 70A. Likewise, a radially outwardly extending reduced thickness flange 68A is also formed in the skirt 66A. The seal of FIG. 2 includes a primary seal assembly 16A, which is similar to its counterpart in respect to the radial and axial flanges 28A, 30A and the outside ribbed elastomeric mounting sleeve 40A. The onl major difference is that the flange 30A may extend radially inwardly a somewhat greater distance and the elastomeric seal body 42A is of a more conventional construction. Thus, the body 42A includes a spring groove 100 accomodating a garter spring 102. It also includes a more precisely located primary seal band forming surface 104 formed at the junction of axially inner and outer frusto-conical surfaces 106, 108. The connecting portion 44A is of reduced thickness, and extends between the body 42A and the bonding portion 38A of the seal. Likewise, the rib portion 56A is comprised entirely of elastomer rather than being fluorocarbon-coated.

In other respects, the seal of FIG. 2 is like that of its counterpart in FIG. 1. It is also contemplated that the seal of FIG. 2, having the more traditional elastomeric seal body shape, might also have its sealing lip or seal band portion coated with a very thin fluorocarbon finish rather than being formed from rubber alone.

FIG. 6 shows that the curling step in the operation is accomplished by using the same or similar die 90A, thereby forming a curled or locking flange 68A of reduced thickness with respect to the major portion 60A of the casing body.

FIG. 2 shows that the radially outermost margin or edge portion 110 of the flange 68A should, as shown by the dotted lines, fall within the region generally designated "R", that is between radial dimensions allowing it to engage a relatively flat, faced off surface 112 on the elastomeric body 42A. Consequently, if there is any tendency of the two seal elements to move axially apart in use, the flange 68A will not engage the frustoconical surface 106 and attempt to lift it from its cooperating sealing surface, as would be the case if the margin 110 or the edge 110 were of too small a diameter. Likewise, if the diameter were too large it would possibly impede flow of lubricant to the seal band area.

Referring now to FIG. 7, a seal is shown which is generally similar to those shown in FIGS. 1-6, except the casing 26A includes a crimped or folded over, double thickness portion 200 lying between the axial flange 28B and the radial flange 30B. Another important difference is that the unitizing casing 26B also includes a cylindrical elastomeric inner mounting sleeve 202 having circumferential ribs 204 on the inner diameter thereof, thus providing a seal which is easier to assemble in some applications. The seal also contains a "snubber" 56B or rib formation similar to its counterpart 56, 56A in the other embodiments, but still further, includes an auxiliary or secondary lip 206 having a seal band portion 208 thereof acting against the inner surface 210 of the flange 70B to form an auxillary excluder lip in a known manner.

An assembly tool generally designated 220 is also shown to be provided and to include first and second assembly reference surfaces 222, 224, spaced slightly axially apart by a dimension "D". The distance "D" is achieved by engagement between the creased portion 200 of the casing 26B and the surface 222 on the one hand and the exterior surface 226 of the flange 70B and its counterpart surface 224 on the tool 220 on the other hand.

Thus, when the seal is inserted in place, the distance D insures that the two elements will be spaced a exactly desired distance apart, preferably enough to slightly preload the snubber and insure that the secondary or auxiliary lip 206 will provide sufficient sealing force without causing undue wear.

A seal of the type shown in FIG. 7 is unitized in the same way as is its counterpart shown in FIGS. 3, 4 and 5, for example, or in FIG. 6, namely, assembling the seal and then curling the end margin of the axial flange to form a unitizing radial flange.

It will be appreciated that, as shown, either the primary seal element or the unitizing casing, or both, may include a mounting surface sleeve made from an elastomer, and that such elastomer may include one or more mounting ribs thereon.

Referring now to FIGS. 8A and 8B, there is shown an alternate form of unitizing casing suitable for use in practicing the invention. Here, a unitizing casing generally designated 26b is shown with portions broken away, and is shown to include an axially extending or wear sleeve flange 60b and a radially extending flange 70b. Instead of having a skirt portion 66, 66b of reduced thickness, the embodiment of FIGS. 8A and 8B includes a skirt 68b which is of the same cross-sectional thickness as the remainder 60b, but is set apart therefrom by an annular line of weakness 61b in the form of a circumferential notch or the like. Consequently, the bending operation used to form the locking flange serves to bend the casing about this line of weakness. Referring to FIG. 8B, after the operation is complete, the portions of the casing lying just to either side of the groove 61b have been folded upon themselves and the element 68b is formed into a radial flange where it serves the same unitizing purpose as does its counterpart 68, 68a in FIGS. 1 and 2, for example. Accordingly, the reduced thickness skirt, or in some cases even the groove, is not strictly necessary, although it is preferred as a convenience for exact location and in making the flange and for ease of assembly and working in manufacture of the seals.

According to the invention, a simple method of protectively unitizing or assembling the seal elements is provided for improved quality control. Moreover, the unitizing operation is simple to carry out in practice, because the final flange formation is accomplished on a reduced thickness skirt portion of the casing and is accomplished only after sealing surfaces are protected during installation and pre-lubricated if necessary. This reduces the incidence of warranty claims.

Seals of the type shown are advantageous in respect to those wherein unitizing casings have large flanges axially inwardly of the primary lip, which reduces oil contact for lubrication and cooling purposes. The present seals are much simpler to manufacture than those having two or three casings which must be successively assembled and bonded. There is no problem with secondary seal leaking as exists with assembled cases. The ability to provide a fine finish and fit, particularly for fluorocarbon seals, is an important advantage of the invention.

It will thus be seen that the present invention provides improved fluid seals and methods of manufacturing such seals, such seals and methods having a number of advantages and characteristics, including those herein pointed out and others which are inherent in the invention. Various preferred forms of the invention having been shown by way of example, it is anticipated that certain changes and modifications may be made to the described forms of seals and methods without departing from the spirit of the invention or the scope of the appended claims.

I claim:

1. A unitized oil seal assembly comprising, in combination, first and second components unitized so as to permit relative rotation between them but to be fixed against unintentional disassembly, said first and second components each having thereon a surface adapted to engage a cooperating surface on an associated machine element in fluid-tight relation, with said components also cooperating with each other in use to form a primary, fluid-tight seal, said first component being a seal element which includes a one-piece rigid seal casing having a mounting flange portion and a body bonding and locating flange portion, said seal element further including a seal body unit made at least partially from an elastomer and having a bonding portion affixed to said bonding and locating flange portion of said casing, a primary sealing surface portion, and a flexible intermediate portion lying between said sealing surface portion and said bonding portion, said second component including a one-piece unitizing casing having a generally cylindrical wear sleeve portion with a wearing surface in opposed facing contact relation with said primary sealing surface portion of said seal body unit, whereby said surfaces form a fluid-tight rotary seal, with said unitizing casing further including an axially outer, radially extending protective flange with its outer edge lying radially outwardly of at least a part of said first component bonding flange, and an axially inner, radially outwardly extending locking flange having its radially outer edge extending radially beyond said sealing surface of said seal body unit, and with said sealing surface on said principal body portion being urged by the inherent resiliency of said principal body portion into said fluid-tight sealing contact with said wearing surface on said wear sleeve, said protective and locking flanges on said unitizing casing each being separated by an axial working clearance from an adjacent part of said seal body unit, whereby, in use, if relative axial movement of said first and second components exceeds said working clearance, one of said protective and locking flanges will engage a portion of said seal body unit and not a part of said seal casing portion of said first component.

2. A seal assembly as defined in claim 1 which further includes a generally cylindrical rubber collar lying radially outwardly of said mounting flange on said sealing element, said collar having an exterior mounting surface thereon forming said surface for engaging said machine element.

3. A seal assembly as defined in claim 1 wherein said second component further includes a generally cylindrical elastomeric collar portion bonded to a part of the inside diameter of said second component wear sleeve for engagement with an associated machine element in fluid-tight relation.

4. A seal assembly as defined in claim 1 wherein said seal body unit is a composite body having one portion thereof made from said elastomer and the other portion thereof comprising a ring of resinous fluorocarbon material, with one surface of said ring forming said sealing surface of said seal body unit and with a surface of said ring lying opposite said sealing surface thereof being bonded to the elastomer forming the other portion of said body.

5. A seal assembly as defined in claim 1 which further includes, as a portion of said seal element, an annular rib formed on the axially outer end of said casing mounting flange and extending axially outwardly therefrom and into engagement with a radially extending axially inwardly directed marginal surface on said protective flange of said unitizing element.

6. A seal assembly as defined in claim 1 wherein said at least partially elastomeric body comprises a body made entirely from elastomer, and wherein said inherent resiliency of said body is supplemented by circumferentially extending garter spring encircling a portion of said elastomeric body.

7. A seal assembly as defined in claim 1 wherein said locking flange is of reduced cross-sectional thickness with respect to the cross-section thickness of the remainder of said unitizing casing.

8. A fluid seal unit comprising, in combination, a first component in the form of a one-piece combination wear sleeve and unitizing element having a generally cylindrically extending wear sleeve portion with radially inner and outer surfaces, one of which is a wearing surface of a given diameter, a radially extending protective flange disposed at one end of and joined to said wear sleeve portion, and a unitizing flange extending radially outwardly from and joined to the other end of said wear sleeve, and, associated therewith in use, a second component in the form of a composite seal having an annular rigid one-piece casing with axially and radially extending flanges, and an elastomeric seal body ring portion of thin cross-section bonded at its outer diameter to the inner diameter of said radial casing flange and terminating at an inner edge portion, said body ring having axially inner and outer end face surfaces, and a ring of a thin, flexible resinous fluorocarbon material also having axially inner and outer end face surfaces, with said resinous ring inner end face surface being covered by and bonded to said elastomeric ring outer end face surface to form a composite seal lip body, said composite seal lip body, as installed, being positioned so that a portion of said resinous ring surface adjacent said inner edge thereof is formed into a frusto-conical section so as to lie along and engage a portion of said cylindrical wear sleeve surface in fluid-tight relation, with said lip body being urged into said fluid-tight relation with said sleeve by the inherent resilience of said elastomeric portion of said seal ring and by deforming reaction forces on said resinous ring, said composite lip body being thereby located between said protective flange and said unitizing flange and held thereby against non-destructive dissassembly.

9. A fluid seal unit as defined in claim 8 which further includes an elastomeric outer seal body portion entirely surrounding said casing, said outer seal body portion further including a circumferentially extending outer mounting surface portion forming a part thereof.

10. A fluid seal as defined in claim 8 which further includes an axially outer end face seal body portion made from an elastomer and extending radially inwardly from said axially extending casing flange so as to cover said radial flange.

11. A fluid seal unit as defined in claim 10 wherein said exterior end face seal body is covered on its axially outermost surface with a resinous fluorocarbon material.

12. A fluid seal unit as defined in claim 7 which further includes an elastomeric seal body formed integrally with said seal body ring and covering the inwardly directed surfaces of said radial and axial casing flanges.

* * * * *